Jan. 22, 1924.
J. P. COUGHLIN
1,481,590
CALCULATING DEVICE
Filed June 13, 1922
3 Sheets-Sheet 1
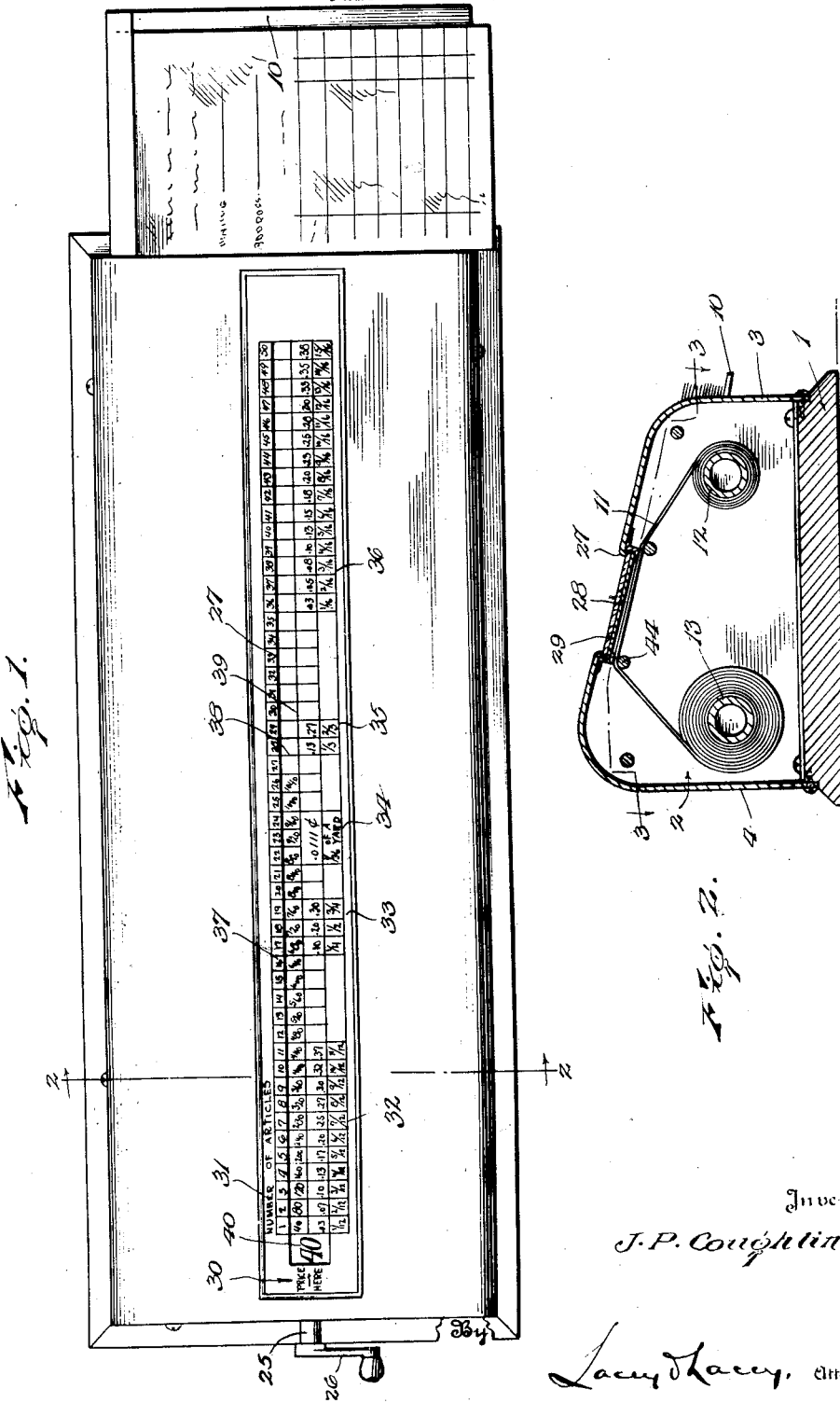

Jan. 22, 1924.
J. P. COUGHLIN
CALCULATING DEVICE
Filed June 13, 1922
1,481,590
3 Sheets-Sheet 2
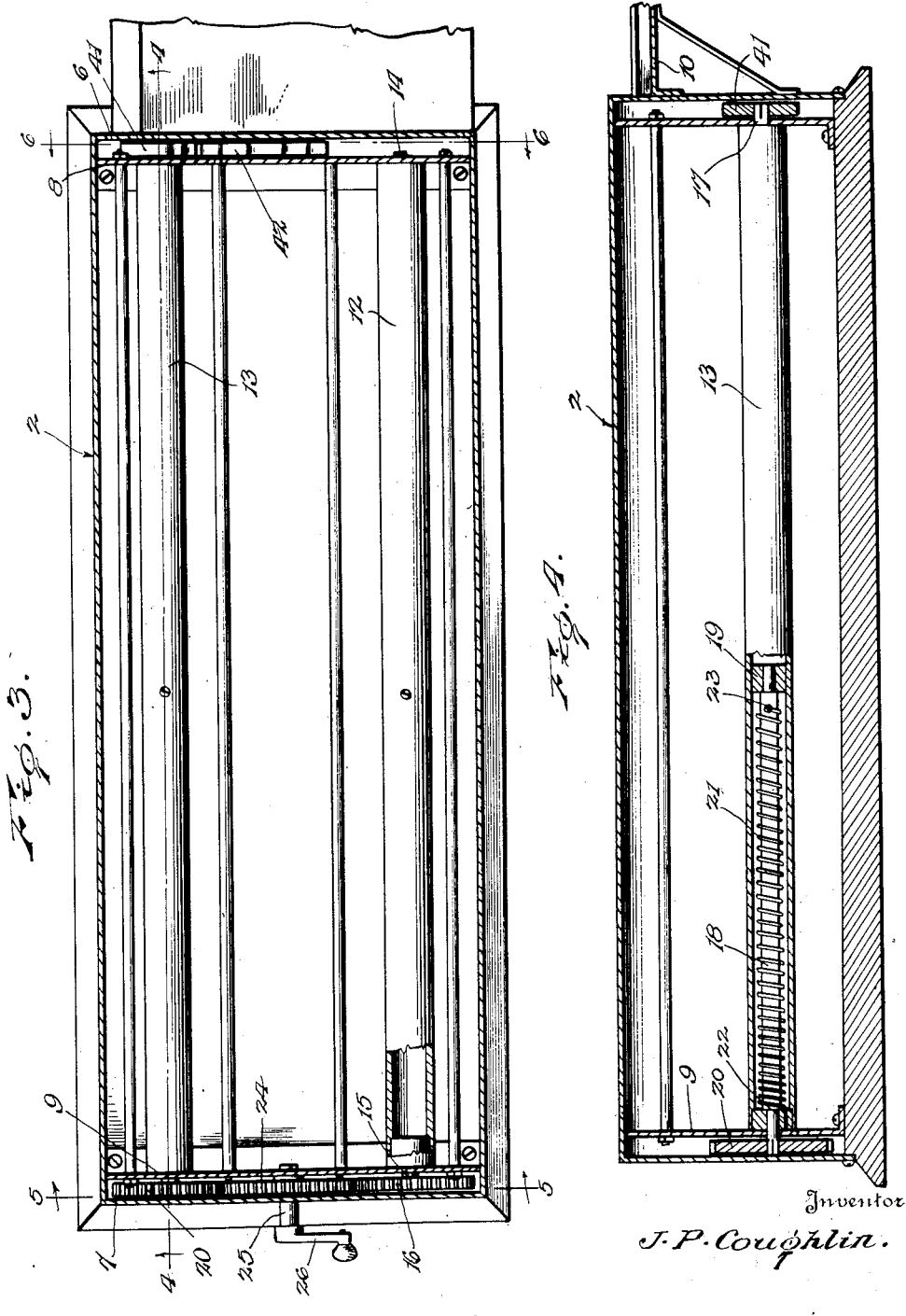
Inventor
J. P. Coughlin.
By
Lacey & Lacey, Attorneys Jan. 22, 1924.
J. P. COUGHLIN
CALCULATING DEVICE
Filed June 13, 1922
1,481,590
3 Sheets-Sheet 3
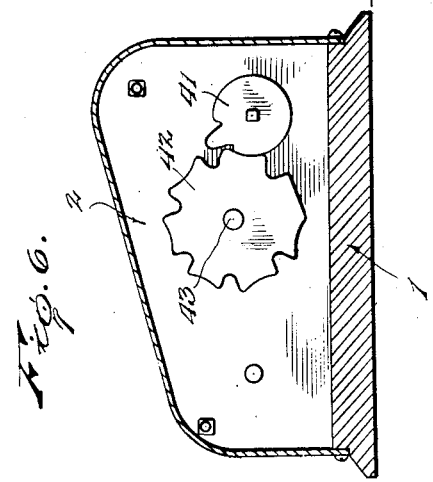
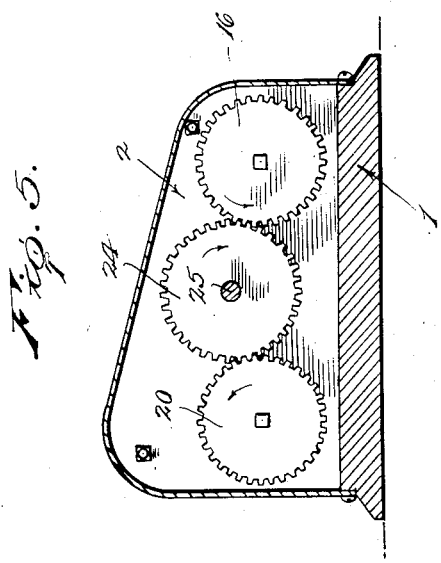
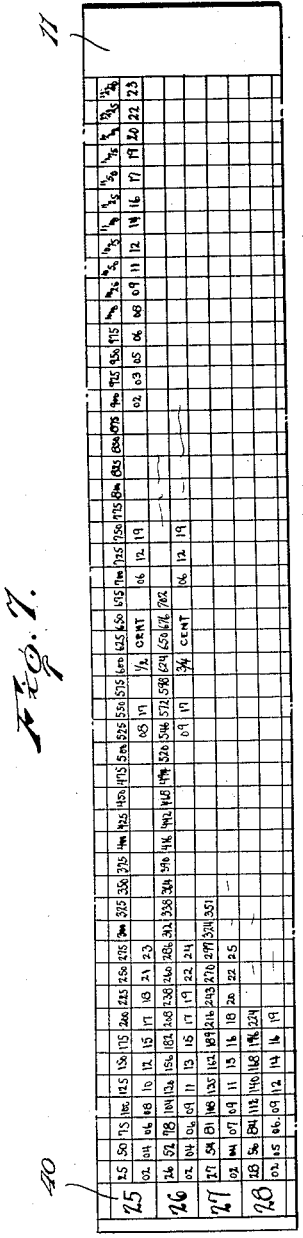
Inventor
J. P. Coughlin.
By
Attorneys Patented Jan. 22, 1924.

1,481,590

UNITED STATES PATENT OFFICE.

JAMES P. COUGHLIN, OF KANSAS CITY, MISSOURI.

CALCULATING DEVICE.

Application filed June 13, 1922. Serial No. 567,989.

*To all whom it may concern:*

Be it known that I, JAMES P. COUGHLIN, a citizen of the United States, residing at Kansas City, in the county of Jackson and State of Missouri, have invented certain new and useful Improvements in Calculating Devices, of which the following is a specification.

This invention relates to improvements in calculating mechanisms and has as its general object to provide a device by the use of which a merchant may readily determine the selling price of the various commodities in which he deals, particularly when sold in unusual quantities or fractions of units of measurement. Where an odd or unusual number of articles are sold or where a commodity is sold in fractions of units of measurement a merchant must resort to arithmetical calculations to determine the selling price and this consumes more or less time and the calculations are subject to error. Therefore, the present invention has as its primary object to provide a device by the use of which, given the selling price of a unit number or a unit of measurement of the commodity to be dispensed, the merchant may immediately determine the selling price of the quantity involved in the transaction and without resorting to an arithmetical computation of the sum involved.

Another object of the invention is to provide a device for the purpose stated, the component parts of which will be compactly arranged and capable of convenient manipulation to immediately present the results of any problem propounded in the course of trade and thus furnish a merchant with a convenient means whereby his sales calculations may be made without resorting to mental or written arithmetical calculation.

In the accompanying drawings:

Figure 1 is a plan view of the device embodying the invention;

Fig. 2 is a vertical transverse sectional view taken substantially on the line 2—2 of Fig. 1 looking in the direction indicated by the arrows;

Fig. 3 is a sectional view taken substantially on the line 3—3 of Fig. 2;

Fig. 4 is a longitudinal sectional view taken substantially on the line 4—4 of Fig. 3 looking in the direction indicated by the arrows;

Fig. 5 is a sectional view taken substantially on the line 5—5 of Fig. 3 looking in the direction indicated by the arrows;

Fig. 6 is a similar view on the line 6—6 of Fig. 3.

Fig. 7 is a plan view of a portion of the chart constituting an element of the device.

The device embodying the invention comprises a base which is indicated by the numeral 1 and which may be of any desired construction and form and with which is assembled a casing, indicated in general by the numeral 2, within which casing are arranged the operating parts of the device. The casing 2 may be formed of sheet metal and it preferably comprises a front wall 3, a rear wall 4, a top wall 5, and end walls 6 and 7, adjacent which latter walls and within the casing there are arranged false end walls or partitions, indicated respectively by the numerals 8 and 9. The end wall 6 is the wall located at the right hand end of the casing when the device is faced, and upon this wall may be supported a sales slip pad supporting means indicated by the numeral 10. The casing 2 and the partition walls 8 and 9 may be arranged and supported by the base 1 in any suitable manner, preferably in such a way as to permit of the casing being separated from the base to provide for access to the device housed within the casing.

The mechanism embodies a chart sheet which is indicated by the numeral 11 and which is wound upon spools or rolls, indicated one by the numeral 12 and the other by the numeral 13. The roll 12 is supported for rotation at its ends by trunnions 14 and 15 journaled in the partition walls 8 and 9, respectively, and there is fixed upon the trunnion 15 a gear which is indicated by the numeral 16 and which is housed between the end wall 7 of the casing and the partition wall 9. The roll or spool 13 is provided at one end with a trunnion 17 journaled in the partition wall 8, and a spindle 18 is rotatably mounted at one end, as at 19, within the spool or roll 13 and at its other end is journaled in the partition wall 9, a gear 20 being fixed upon this last-mentioned end of the spindle and likewise housed between the end wall 7 and partition wall 9 of the casing. A spring 21 is arranged upon the spindle 18 and is fixed at one end, as at 22, in the end of the spool 13 and at its other end, as at 23, to the said spindle 18, it being understood that when the spool 13 is rotated in one direction the spring 21 will be tensioned substantially in the manner of a shade roller, such as employed in windows. The chart sheet 11 is wound upon the spool 13 and is to be unwound therefrom, in the use of the device against the tension of the spring 21, this spring when tensioned constituting a means for backwardly rotating the spool 13 so as to rewind the chart sheet thereon.

The gears 16 and 20 mesh with a gear 24 which is fixed upon a stub spindle 25 mounted in the walls 7 and 9 of the casing and provided with an operating crank handle 26. Of course, by rotation of the crank handle 26, the spools 12 and 13 will be rotated in a manner to unwind the chart sheet from one spool and wind it on to the other spool and in this movement of the sheet it is caused to pass beneath a sight opening or slot 27 which is formed in the top 5 of the casing 2, a pane 28 of glass being preferably arranged within this sight opening so as to protect and cover the face of the said sheet. The pane 28 also covers a strip 29 upon which various legends may be printed as, for example, one, indicated by the numeral 30, indicating the unit price of a commodity, another indicated by the numeral 31, to indicate the number of articles, another indicated by the numeral 32, to designate fractions of dozens of articles, another indicated by the numeral 33, to designate fractions of a unit quantity of the commodity, another by the numeral 34, to designate fractions of a unit of linear measurement where the commodity is sold by such measurement, and others by the numerals 35 and 36 to denote other fractions of units. The legends 32, 33, 34, 35, and 36 are associated with numerical characters designating the units or fractions of units to which the legends relate, and in like manner the legend 31 is associated with a longitudinally extending series of consecutively arranged ordinals indicated by the numeral 37, indicative of the number of articles involved in a transaction. The numerical designations associated with the various legends are preferably arranged within the space defined by printed lines of demarkation upon the face of the strip 29, and the face of the sheet 11 is divided by longitudinal and transverse lines indicated, respectively, by the numerals 38 and 39, to define spaces within which are printed certain monetary values which bear relation to a unit of value indicated by the numeral 40 and printed at one margin of the sheet so as to be displayed at one end of the sight opening 27, as best shown in Fig. 1 of the drawings. By referring to Fig. 1 it will be readily understood that in the spaces defined by the lines 38 and 39 upon the chart sheet 11 there will be printed numerical designations indicating the total selling price of such multiples of units of the articles as are indicated in the spaces 37. Likewise in the spaces defined by said lines 38 and 39 and which spaces are to be brought into registration with the corresponding spaces associated with the legends 32, 33, 34, 35 and 36, there will be printed numerical designations indicating the selling price of the fractional parts of units of such articles as determined by the selling price indicated in the space 40.

The device is to be operated by rotating the crank handle 26 so as to bring into registration with the sight opening 27, that portion of the area of the sheet 11 which bears the selected price-indicating numeral or designation 40.

In order to prevent overwinding of either of the spools 12 and 13, gearing is provided in connection with the trunnion 17 of the spool 13 and this gearing comprises an intermittent gear 41, which is fixed upon said trunnion 17 and which meshes and cooperates with an intermittent gear 42 mounted upon a stub spindle 43, the gears 41 and 42 being housed between the end wall 6 and partition wall 8 of the casing. The said gears 41 and 42 are of a usual type and perform their functions in the usual manner.

In order that the portion of the strip or sheet 11 which is to be displayed through the sight opening 27 may be presented in a flat condition, rods 44 are extended within the casing between the partition walls 8 and 9 thereof, as best shown in Fig. 2 of the drawings, at the upper and lower sides of said opening, and the said sheet is led over these rods.

Having thus described the invention, what is claimed as new is:

In a device of the class described, a casing having a sight opening extending longitudinally in its top, means above the sight opening parallel to the upper side thereof designating units relating to the quantities or measurements of commodities to be dispensed, means parallel to the lower side of the sight opening designating fractions of units relating to the quantities or measurements of the commodities to be dispensed, and a sheet movable relative to said opening and bearing at one side a numerical designation of the price of a unit quantity of the commodity, the said sheet, opposite to the numerical designation having parallel longitudinal lines of numerical designations, the upper line relating to the price of unit quantities, in multiple, of the commodity and bearing relation to the upper designating means first mentioned, the lower line of designating numerals indicating the selling price of fractional quantities of the commodity and cooperating with the lower designating means first mentioned.

In testimony whereof I affix my signature.

JAMES P. COUGHLIN.